Sept. 9, 1930.  L. W. SHUTTS  1,775,624
ANTISHIMMY DEVICE
Filed Aug. 25, 1928

Inventor
Leroy W. Shutts
By Blackmore, Spencer & Hink
Attorneys

Patented Sept. 9, 1930

1,775,624

UNITED STATES PATENT OFFICE

LEROY W. SHUTTS, OF DETROIT, MICHIGAN, ASSIGNOR TO GENERAL MOTORS RESEARCH CORPORATION, OF DETROIT, MICHIGAN, A CORPORATION OF DELAWARE

ANTISHIMMY DEVICE

Application filed August 25, 1928. Serial No. 302,024.

This invention relates to steering mechanisms for motor vehicles and particularly to a device for dampening front wheel wobble or shimmy, and is an improvement of the device disclosed in Letters Patent No. 1,712,940, issued to C. R. Short.

One of the objects of the present invention is to provide a flexible or elastic motion transmitting connection between the front wheel spindles and an inertia weight or fly wheel which permits a difference of variation in the phase relation of the vibrating or wobble movements of the road wheel and fly wheel. This difference in phase or lag, permits the momentum of the fly wheel to effectually oppose movements of the road wheels when they tend to shimmy, and so serves to damp out and eliminate the tramp and wobble that so quickly tires out the driver and makes travel hazardous, particularly at higher speeds.

The invention will be more clearly understood upon reference to the accompanying drawing, wherein Fig. 1 is a view showing the front axle and steering mechanism with the present vibration resisting device applied thereto.

Figure 1:
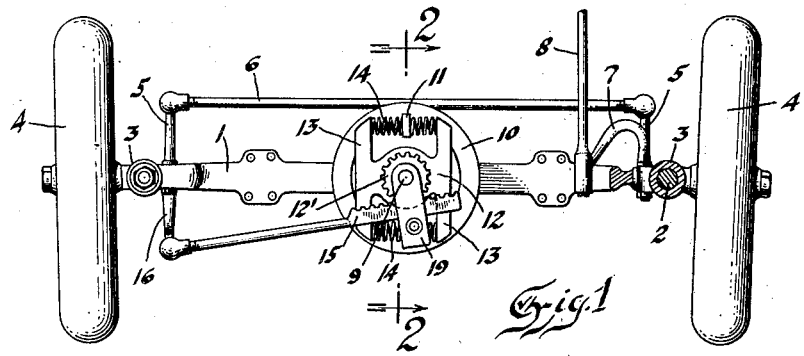
Figure 2:
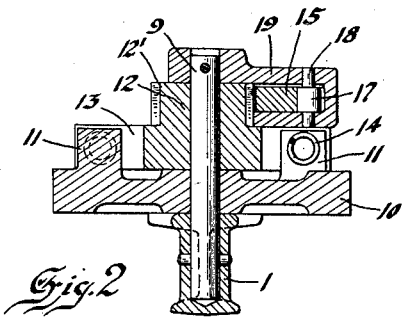
Fig. 2 is a section taken on line 2—2 of Fig. 1.
Figure 4:
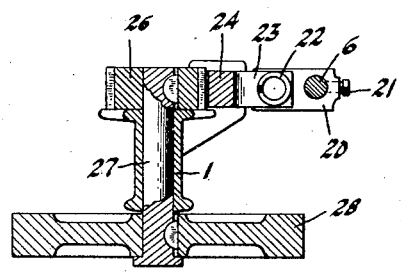
Fig. 4 is a section taken on line 4—4 of Fig. 3.

Referring by reference characters to the accompanying drawing, the numeral 1 indicates a front axle having forked ends, in each of which is pivotally mounted upon a pin 2, a steering knuckle 3 having a spindle upon which is rotatably mounted the road wheel 4. Each knuckle is provided with a rearwardly extending arm or lever 5, connected with each other by a tie rod 6, and one of the knuckles is also provided with a steering arm 7 connected by a drag link 8 to suitable steering mechanism which includes a hand or steering wheel, not shown. Carried by the axle 1 at a central point and extending either above or below the axle depending upon conditions of use, is a vertical shaft or stud 9. The shaft in the present case is shown extending above the axle and has mounted thereon for rotation a fly wheel or inertia weight 10, provided with a pair of oppositely disposed integral upstanding lugs 11. Also mounted on the shaft 9 above the fly wheel is a member 12 that has two pair of lateral projections or fingers 13, each pair extending on opposite sides of one of the lugs 11. Between each finger 13 and the adjacent lug is a coil spring 14, which serves to yieldingly transmit relative movement from one to the other of the member 12 and the fly wheel 10. Connected or formed integral with the member 12 is a gear pinion 12' that meshes with the rack bar 15, whose end is pivoted to an arm or lever 16 carried by one of the steering knuckles 3. To hold the rack in mesh with the gear pinion, a roller 17 is provided for engagement with the back of the rack, the roller being carried on a pin 18 in a bracket 19 that is secured on the upper end of the shaft 9.

The quick to and fro wobble movement of the wheels is transmitted through the rack and gear to the member 12 which acts through the coil springs to set in motion the fly wheel 10. The elasticity of the springs provides a sort of lost motion connection which permits a relative movement of the fly wheel with respect to the road wheels, whereby there results a lag in the phase of vibratory movement of these two elements. The fly wheel, of course, follows the movement of the road wheels but because of the resiliency of springs 14, the reversal or change in the direction of wheel spindle motion, is in direct opposition to the direction of fly wheel rotation at that instant, and the force in the fly wheel cancels out a large part of energy of the moving spindle before assuming the reverse direction of rotation. The amplitude of wobble is thus materially reduced to a point where it is hardly perceptible.

Figure 3:
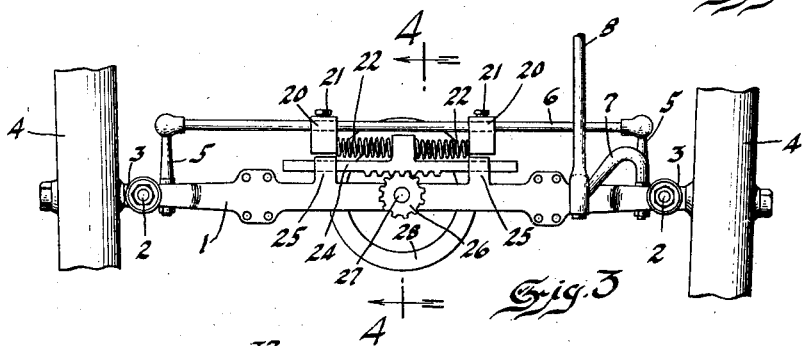
Fig. 3 is a top plan view of the front axle assembly showing a modification.

In the modification illustrated in Fig. 3, a pair of lugs 20 are adjustably held on the tie rod 6 by means of set screws 21 and form seats for a pair of springs 22 that abut on opposite sides of the lug 23 formed on the rack bar 24.

The ends of the rack bar are mounted for sliding movement in bearings 25 carried by the axle 1 and its teeth engage with a gear pinion 26 keyed on the shaft 27 extending through the axle 1 and having keyed at its lower end the fly wheel 28. The action of the yielding connection is the same in this case as that previously described.

Figure 5:
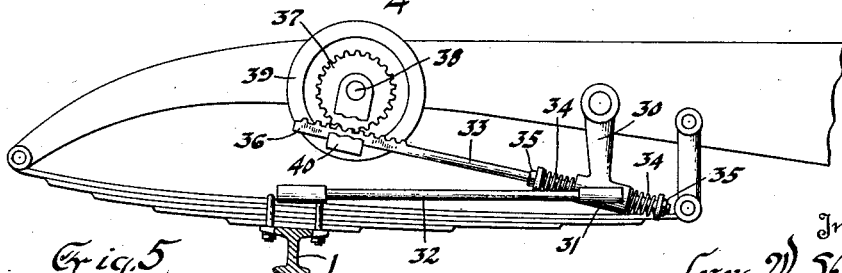
Fig. 5 is a side elevation of a portion of a chassis frame, showing a further modification.

In Fig. 5 a steering arm 30 is provided with a hollow head 31 to one side of which is pivotally connected the drag link 32 and through which extends one end of a rod 33. On opposite sides of the head 31 are positioned coil springs 34 held on the rod by nuts 35 and at the opposite end of the rod is formed a rack bar 36 that meshes with a pinion 37 mounted on a shaft 38 upon which is also mounted the fly wheel 39 connected to the pinion 37 for rotation therewith. A guide 40 is carried by the shaft 38 to hold the rack in position for engagement with the pinion. It will be understood that the drag link 32 is connected at its forward end to the conventional steering arm carried by front wheel knuckle and that upon wheel shimmy the movement will be transmitted to the fly wheel 39 through the springs 34, which permit the lag in relative movements that serves so effectively in restricting and minimizing wheel wobble.

Various modifications of the structure will be obvious to those skilled in the art.

I claim:

1. In a motor vehicle, the combination with a dead axle and a pair of spindles pivotally mounted on opposite ends of the axle and carrying road wheels, of means to dissipate the energy generated by sudden forces originating in the pivoted spindles, including a flywheel monted for free rotation on the axle and having a pair of spaced abutment members thereon, an H-shaped member also rotatably mounted on the axle and in superposed relation with the flywheel, with the one pair of legs on opposite sides of one abutment member and the other pair on opposite sides of the other abutment member, a rigid motion-transmitting connection to oscillate said H-shaped member upon movement of the spindles, and elastic elements interposed between opposite sides of each abutment member and the adjacent legs of the H-shaped member to impart rotation of the H-shaped member to the flywheel with a lag whereby an out-of-phase relationship is set up.

2. In a motor vehicle, the combination with a dead axle and a pair of spindles pivotally mounted on opposite ends of the axle and carrying road wheels, of means to dissipate the energy generated by sudden forces originating in the pivoted spindles comprising a freely rotatable flywheel, an independently rotatable member superposed upon the flywheel and connected for oscillation with the spindles, and an elastic motion trasmitting element for imparting the oscillations of said member to the flywheel whereby the rotation of the flywheel momentarily lags as its energy builds up to oppose and damp the reactionary forces.

3. The vibration dampener for devices subject to vibration including a freely rotatable flywheel having a pair of spaced abutment members thereon, a rotatable H-shaped member in superposed relation with the flywheel, with the one pair of legs on opposite sides of one abutment member and the other pair on opposite sides of the other abutment member, a rigid motion transmitting connection to oscillate said H-shaped member upon movement of a vibrating device, and elastic elements interposed between opposite sides of each abutment member and adjacent legs of the H-shaped member to impart rotation of the H-shaped member to the flywheel with a lag whereby an out-of-phase relationship is set up.

In testimony whereof I affix my signature.

LEROY W. SHUTTS.